United States Patent Office 3,444,228
Patented May 13, 1969

3,444,228
2,2,5,5-TETRAMETHYL-2,5-DISILA-1,3-DIOXOLAN AND PROCESS THEREFOR
Walter Simmler, Odenthal-Schlinghofen, Hans Niederprum, Monheim, and Hans Sattlegger, Cologne-Buchheim, Germany, assignors to Farbenfabriken Bayer Aktiengesellschaft, Leverkusen, Germany, a corporation of Germany
No Drawing. Filed July 6, 1966, Ser. No. 563,065
Claims priority, application Germany, Aug. 7, 1965, F 46,845
Int. Cl. C07f 7/18, 7/02, 7/08
U.S. Cl. 260—448.8       3 Claims This invention relates to a novel oxymethyl silicon compound, in particular one with the atomic sequence $$-\overset{|}{\underset{|}{Si}}-O-\overset{|}{\underset{|}{C}}-\overset{|}{\underset{|}{Si}}-O-$$

which is suitable for specifically directed copolymerization with other organosilicon or silicon-free organic compounds with the introduction of the radical $$-O-\overset{|}{\underset{|}{C}}-\overset{|}{\underset{|}{Si}}-$$

and to a process for its preparation whereby it is obtained in the purity and with the uniformity of structure which are necessary for this purpose, with good yield and at acceptable expenses.

The only distillable compound hitherto described with the atomic sequence specified above is 2,2,5,5-tetramethyl-2,5-disila-1,4-dioxan of the formula $$\begin{array}{c} O-Si(CH_3)_2-CH_2 \\ | \qquad\qquad\qquad | \\ H_2C-Si(CH_3)_2-O \end{array}$$

which is obtained from 1,3-di-(hydroxymethyl)-tetramethyldisiloxane by heating with calcium oxide. The yield achieved by this process, however, was only half of the theoretical amount. Moreover, more detailed investigations have shown that this reaction is accompanied by splitting off of methanol, and that, therefore, the product prepared in this way is not homogeneous.

A new oxymethyl silicon compound of the formula $$\begin{array}{c} Si(CH_3)_2-O \\ \diagup \qquad\qquad | \\ O \qquad\qquad\qquad | \\ \diagdown \qquad\qquad | \\ Si(CH_3)_2-CH_2 \end{array}$$

has now been found, hereinafter called 2,2,5,5-tetramethyl-2,5-disila-1,3-dioxolan, which is eminently suitable as an intermediate for the purposes mentioned above. This compound is obtained in very high yield and purity in either of the following ways:

(a) By heating a mixture of equimolar amounts of 1,3-di-(hydroxymethyl)-tetramethyldisiloxane and 1,3-di-(bromomethyl)-tetramethyldisiloxane and an ample excess of triethylamine until the salt precipitation which occurs is completed, removing the nitrogen compounds from the reaction mixture by filtration and evaporation, adding a catalytic amount of p-toluenesulphonic acid to the remaining liquid, subjecting this to distillation under reduced pressure, and obtaining the 2,2,5,5-tetramethyl-2,5-disila-1,3-dioxolan which is formed an evaporates as distillate, or (b) By heating a mixture of equimolar amounts of dimethyl-(acetoxymethyl)-acetoxysilane and dimethyldiethoxysilane, a five-fold to twenty-fold molar amount of methanol and a catalytic amount of p-toluenesulphonic acid to boiling temperature at atmospheric pressure, distilling off the methyl acetate which is formed, the excess methanol, and the ethanol which is also formed, subjecting the remainder of the reaction mixture to distillation under reduced pressure, and obtaining the 2,2,5,5-tetramethyl-2,5-disila-1,3-dioxolan which is formed and evaporates as distillate.

The salt which precipitates in the reaction according to (a) can, after washing with ether, be identified by its infrared and proton magnetic resonance spectra as methyltriethylammonium bromide. The p-toluenesulphonic acid as catalyst causes intermediately formed higher polycondensates to be depolymerized, so that the yield of the process remains only slightly below the stoichiometric amount.

The product can be used for the preparation of further organopolysiloxanes, silicon-containing polyesters and polyurethanes and of polysiloxane-polyoxyalkylene co-condensates and, further, for the modification of organopolysiloxane elastomers, trioxan polymers and other synthetic resins, such as polycarbonates and phenol-formaldehyde resins. Thus it yields, hydrolyzed by itself, 1,7-di-(hydroxymethyl)-octamethyltetrasiloxane in theoretical yield; by cohydrolysis with organoalkoxysilanes, organopolysiloxanes with terminal hydroxymethyl groups are obtained. Copolymerisation with trioxan leads to polyoxymethylenes with siloxane segments.

The following examples are given for the purpose of illustrating the invention.

Example 1

$$O[-Si(CH_3)_2-CH_2-OH]_2 + O[-Si(CH_3)_2-CH_2-N(C_2H_5)_3^{\oplus}]_2Br^{\ominus}_2 \rightarrow$$

$$\overline{2Si(CH_3)_2-O-CH_2-Si(CH_3)_2-O} + 2[(C_2H_5)_3NCH_3]Br$$

A mixture of 194 g. (1 mole) 1,3-di-(hydroxymethyl)-tetramethyldisiloxane, 320 g. (1 mole) 1,3-di-(bromomethyl)-tetramethyldisiloxane and 400 g. (4 moles) triethylamine is boiled for 30 hours under reflux, the salt which is precipitated during the reaction being filtered off every 5 hours in order to avoid bumping. The excess triethylamine is then evaporated from the filtrate, finally under reduced pressure, and the residue is again freed from salt which has precipitated anew by filtration. 8 g. p-toluenesulphonic acid are added to the filtrate and 2,2,5,5-tetramethyl-2,5-disila-1,3-dioxolan, which boils between 43 and 45° C., is distilled therefrom at a pressure between 4 and 5 mm. Hg. There remains behind 18 g. of a viscous residue; the yield of distillate is 97% of the theoretical amount, and the product has a refractive index $n_D^{20} = 1.4230$, a carbon content of 37.2% (calculated: 37.0%) and a hydrogen content of 8.75% (calculated: 8.69%).

Example 2

$$CH_3-C(O)-O-CH_2-Si(CH_3)_2-O-C(O)-CH_3 + (CH_3)_2Si(OC_2H_5)_2 + 2HOCH_3 \longrightarrow$$

$$\overline{(CH_3)_2Si-O-CH_2-Si(CH_3)_2-O} + 2CH_3-C(O)-OCH_3 + 2HOC_2H_5$$

A mixture of 190 g. (1 mole) dimethyl-(acetoxymethyl)-acetoxysilane, 148 g. (1 mole) dimethyldiethoxysilane, 320 g. (10 moles) methanol and 6 g. p-toluenesulphonic acid is heated to boiling in a distillation device with column and the acetic acid-methyl ester which forms is distilled off continuously over a period of 3 hours. With gradual temperature increase to 150° C., heating of the residue is continued for a further 3 hours, the remaining methanol, and the ethanol which is formed meanwhile, being evaporated. The residue is then further distilled, fractionated under vacuum, and 85% of the theoretical amount of 2,2,5,5-tetramethyl-2,5-disila-1,3-dioxolan is obtained in the distillate.

What we claim is:

1. 2,2,5,5-tetramethyl-2,5-disila-1,3-dioxolan of the formula

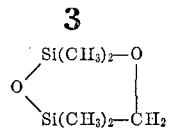

2. Process for the preparation of the compound of claim 1 which comprises heating a mixture of equimolar amounts of 1,3-di-(hydroxymethyl)-tetramethyldisiloxane and 1,3-di-(bromomethyl)-tetramethyldisiloxane and an excess of triethylamine until the salt precipitation which occurs is completed, removing the nitrogen compounds from the reaction mixture by filtration and evaporation, adding a catalytic amount of p-toluenesulphonic acid to the remaining liquid, subjecting this to distillation under reduced pressure, and recovering the 2,2,5,5-tetramethyl-2,5-disila-1,3-dioxolan which is formed and evaporates as distillate.

3. Process for the preparation of the compound of claim 1 which comprises heating a mixture of equimolar amounts of dimethyl-(acetoxymethyl)acetoxysilane and dimethyldiethoxysilane, a five-fold to twenty-fold molar amount of methanol and a catalytic amount of p-toluenesulphonic acid to boiling temperature at atmospheric pressure, distilling off the methyl acetate which is formed, the excess methanol, and the ethanol which is also formed, subjecting the remainder of the reaction mixture to distillation under reduced pressure, and recovering the 2,2,5,5-tetramethyl-2,5-disila-1,3-dioxolan which is formed and evaporates as distillate.

References Cited
UNITED STATES PATENTS

| | | | |
|---|---|---|---|
| 2,983,744 | 5/1961 | Knoth | 260—448.8 X |
| 3,256,308 | 6/1966 | Sterling et al. | 260—448.8 |
| 3,328,340 | 6/1967 | Vaughn | 260—448.8 X |

TOBIAS E. LEVAN, *Primary Examiner.*

P. F. SHAVER, *Assistant Examiner.*

U.S. Cl. X.R.

260—46.5, 824, 826